United States Patent
Smith et al.

(10) Patent No.: US 10,329,982 B2
(45) Date of Patent: Jun. 25, 2019

(54) CONTROL RESET AND DIAGNOSTIC TO MAINTAIN TAILPIPE COMPLIANCE

(71) Applicant: GM GLOBAL TECHNOLOGY OPERATIONS LLC, Detroit, MI (US)

(72) Inventors: Michael A Smith, Clarkston, MI (US); Giuseppe Mazzara Bologna, Nicosia (IT); Giulio Binetti, Molfetta (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1 day.

(21) Appl. No.: 15/827,133

(22) Filed: Nov. 30, 2017

(65) Prior Publication Data
US 2019/0162094 A1   May 30, 2019

(51) Int. Cl.
*F01N 11/00* (2006.01)
*F01N 3/20* (2006.01)
(Continued)

(52) U.S. Cl.
CPC ......... *F01N 3/208* (2013.01); *B01D 53/9431* (2013.01); *B01D 53/9495* (2013.01);
(Continued)

(58) Field of Classification Search
CPC ........ F01N 3/208; F01N 3/2066; F01N 11/00; F01N 2560/026; F01N 2610/02
See application file for complete search history.

(56) References Cited

U.S. PATENT DOCUMENTS

| | | | |
|---|---|---|---|
| 9,708,953 B1* | 7/2017 | Szailer | F01N 3/2066 |
| 2005/0103000 A1* | 5/2005 | Nieuwstadt | F01N 3/035 60/286 |

(Continued)

OTHER PUBLICATIONS

U.S. Appl. No. 15/655,398, filed Jul. 20, 2017 by GM Global Technology Operations LLC.

(Continued)

*Primary Examiner* — Jonathan R Matthias

(57) ABSTRACT

A method, control system, and vehicle system configured to control a selective catalyst reduction (SCR) system subtracts an amount of $NO_x$ present in a tailpipe upstream of the SCR system from an amount of $NO_x$ present in the tailpipe downstream of the SCR injector. A cumulative difference may be determined based on integrating the subtracted $NO_x$ value. The method, control system, and vehicle system are configured to determine whether the cumulative difference exceeds a control threshold, and to set a selected upstream $NO_x$ value as a predetermined model upstream $NO_x$ amount if the cumulative difference exceeds the control threshold, but to set the selected upstream $NO_x$ value as the determined upstream $NO_x$ amount if the cumulative difference does not exceed the control threshold. Thus, the system is reset to the model when downstream $NO_x$ values exceed upstream $NO_x$ values above a threshold, to bring the system back within control.

20 Claims, 7 Drawing Sheets

(51) Int. Cl.
*F01N 9/00* (2006.01)
*B01D 53/94* (2006.01)
*F01N 3/035* (2006.01)

(52) U.S. Cl.
CPC ............ *F01N 3/035* (2013.01); *F01N 9/005* (2013.01); *B01D 2255/911* (2013.01); *B01D 2255/915* (2013.01); *F01N 2570/18* (2013.01); *F01N 2610/02* (2013.01); *F01N 2900/1614* (2013.01)

(56) References Cited

U.S. PATENT DOCUMENTS

2011/0252767 A1* 10/2011 Lin .................. F01N 3/208
   60/274
2012/0260625 A1* 10/2012 Feldmann ............ F01N 3/2066
   60/273
2016/0160785 A1* 6/2016 Basu .................. F01N 3/208
   701/104

OTHER PUBLICATIONS

U.S. Appl. No. 15/481,941, filed Apr. 7, 2017 by GM Global Technology Operations LLC.

* cited by examiner

CONTROL RESET AND DIAGNOSTIC TO MAINTAIN TAILPIPE COMPLIANCE

FIELD

The subject disclosure relates to selective catalytic reduction in motor vehicles and, more particularly, to a method and system for controlling a selective catalytic reduction system.

INTRODUCTION

A selective catalytic reduction (SCR) system relies on a catalyst having a washcoat and a gaseous reductant to convert nitrogen oxide compounds ($NO_x$) into nitrogen and water. During operation, a reductant, such as ammonia or urea, is injected into a housing of the SCR system in an amount sufficient to promote a chemical reaction that maintains desirable performance characteristics.

Maintaining the desirable reductant injection ensures that emissions exiting a tail pipe stay within selected ranges. Too little reductant results in $NO_x$ emissions remaining unconverted, while too much reductant wastes reductant and may also result in the extra reductant itself converting to $NO_x$ and/or slipping into the atmosphere. When too much reductant is injected through the SCR device, an excess of ammonia may exist, a condition that is referred to as ammonia slip because ammonia slips through without reacting with existing $NO_x$. As will be explained in greater detail below, if the amount of ammonia slip becomes high enough or the perceived extra ammonia within the SCR system is perceived by the control system as being more than adequate, the control loop may become stuck and will cut off all reductant injection.

Accordingly, it is desirable to provide a system and method to control the SCR system to ensure that proper levels of reductant are injected to abate emissions as desired.

SUMMARY

The present disclosure provides an SCR control system that resets an upstream $NO_x$ sensor signal to a predetermined calibrated model of the upstream $NO_x$ sensor signal when the downstream $NO_x$ sensor signal exceeds the upstream $NO_x$ sensor signal (or integrated upstream $NO_x$ sensor signal) by a certain threshold, to avoid a stuck sensor resulting in the halting of reductant injection.

In one form, which may be combined with or separate from the other forms disclosed herein, a method of controlling a selective catalyst reduction (SCR) reductant delivery system is provided. The method includes determining an amount of nitrogen oxide compounds ($NO_x$) present in a tailpipe at a first location upstream of a reductant injector to define a determined upstream $NO_x$ amount, and determining an amount of $NO_x$ present in the tailpipe at a second location downstream of the reductant injector to define a determined downstream $NO_x$ amount. The method further includes subtracting the determined upstream $NO_x$ amount from the determined downstream $NO_x$ amount to define a subtracted $NO_x$ value, and determining a cumulative difference based on the subtracted $NO_x$ value. In addition, the method includes determining whether the cumulative difference exceeds a control threshold. The method includes setting a selected upstream $NO_x$ value as a predetermined model upstream $NO_x$ amount if the cumulative difference exceeds the control threshold and setting the selected upstream $NO_x$ value as the determined upstream $NO_x$ amount if the cumulative difference does not exceed the control threshold.

In another form, which may be combined with or separate from the other forms disclosed herein, a selective catalytic reduction reductant injection control module is provided that includes a processor and a non-volatile memory including a set of instructions which are configured to cause the processor to perform the following: determine an amount of nitrogen oxide compounds ($NO_x$) present in a tailpipe at a first location upstream of a reductant injector to define a determined upstream $NO_x$ amount; determine an amount of $NO_x$ present in the tailpipe at a second location downstream of the reductant injector to define a determined downstream $NO_x$ amount; subtract the determined upstream $NO_x$ amount from the determined downstream $NO_x$ amount to define a subtracted $NO_x$ value; determine a cumulative difference based on the subtracted $NO_x$ value; determine whether the cumulative difference exceeds a control threshold; set a selected upstream $NO_x$ value as a predetermined model upstream $NO_x$ amount if the cumulative difference exceeds the control threshold; and set the selected upstream $NO_x$ value as the determined upstream $NO_x$ amount if the cumulative difference does not exceed the control threshold.

In yet another form, which may be combined with or separate from the other forms disclosed herein, a vehicle system is provided that includes a tailpipe and a selective catalytic reduction (SCR) system including a reductant injector and a housing, where the reductant injector is configured to inject a reductant into the housing, the housing being in fluid communication with the tailpipe. An upstream $NO_x$ sensor configured to measure nitrogen oxide compounds ($NO_x$) in an exhaust flow stream is disposed in fluid communication with the tailpipe at a location upstream of the SCR system. A downstream $NO_x$ sensor configured to measure $NO_x$ in the exhaust flow stream is disposed in fluid communication with the tailpipe at a location at least partially downstream of the SCR system. A reductant injection control module includes a processor and a non-volatile memory including a set of instructions configured to cause the processor to: determine an amount of $NO_x$ present in the tailpipe based on an upstream signal from the upstream $NO_x$ sensor to define a determined upstream $NO_x$ amount; determine an amount of $NO_x$ present in the tailpipe based on a downstream signal from the downstream $NO_x$ sensor to define a determined downstream $NO_x$ amount; subtract the determined upstream $NO_x$ amount from the determined downstream $NO_x$ amount to define a subtracted $NO_x$ value; determine a cumulative difference based on the subtracted $NO_x$ value; determine whether the cumulative difference exceeds a control threshold; set a selected upstream $NO_x$ value as a predetermined model upstream $NO_x$ amount if the cumulative difference exceeds the control threshold; and set the selected upstream $NO_x$ value as the determined upstream $NO_x$ amount if the cumulative difference does not exceed the control threshold.

Further additional features may be provided, including but not limited to the following: the method or control/vehicle system being configured to determine whether to inject a reductant based on the selected upstream $NO_x$ value and the determined downstream $NO_x$ amount; the method or control/vehicle system being configured to inject the reductant according to a predetermined model based on the selected upstream $NO_x$ value and the determined downstream $NO_x$ amount; the method or control/vehicle system being configured to determine the determined upstream $NO_x$ amount as a mass of $NO_x$ based on an upstream exhaust fluid flow rate at the first location; the method or control/vehicle system being configured to determine the determined downstream $NO_x$ amount as a mass of $NO_x$ based on a downstream exhaust fluid flow rate at the second location; the method or control/vehicle system being configured to determine the cumulative difference by integrating the subtracted $NO_x$ value with previous subtracted $NO_x$ values obtained earlier in a key cycle; the method or control/vehicle system being configured to determine whether the cumulative difference exceeds a diagnostic threshold; the method or control/vehicle system being configured to activate a diagnostic signal if the cumulative difference exceeds the diagnostic threshold; the method or control/vehicle system being configured to determine the control threshold and the diagnostic threshold based on a maximum ammonia storage capacity of the SCR system; the method or control/vehicle system being configured to determine a maximum storage capacity multiplier based on the maximum ammonia storage capacity of the SCR system; the method or control/vehicle system being configured to determine the control threshold by multiplying the maximum storage capacity multiplier by a control constant; the method or control/vehicle system being configured to determine the diagnostic threshold by multiplying the maximum storage capacity multiplier by a diagnostic constant; wherein the diagnostic constant is greater than the control constant; wherein the diagnostic threshold is greater than the control threshold; the method or control/vehicle system being configured to increment a counting device to define a count each time the selected upstream $NO_x$ value is set as the predetermined model upstream $NO_x$ amount; and the method or control/vehicle system being configured to diagnose a sensor error if the count exceeds a predetermined count threshold.

Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
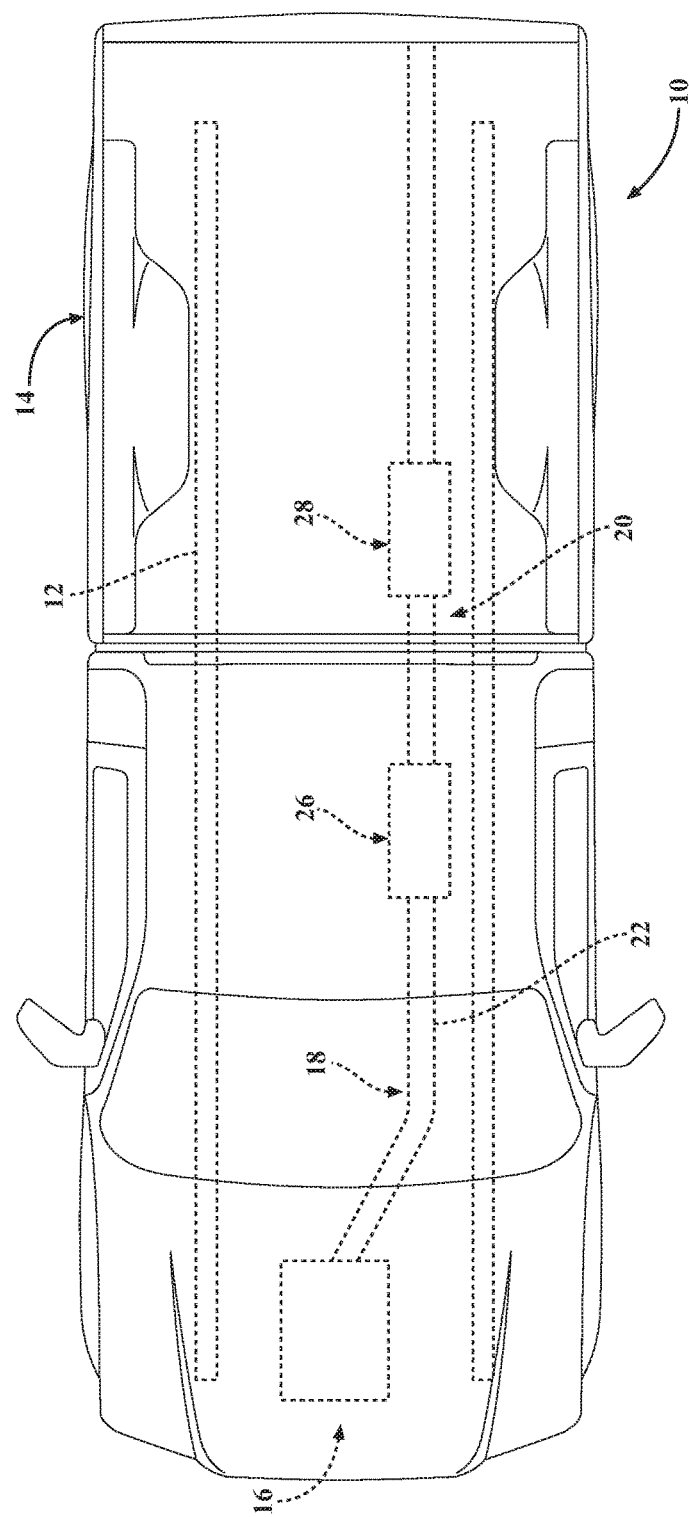
FIG. 1 is a schematic plan view of a vehicle including an SCR system, in accordance with the principles of the present disclosure.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle is schematically illustrated and generally designated at 10. The vehicle 10 is shown in the form of a pick-up truck, however, it should be understood that the vehicle 10 may take on any other variety of forms. The vehicle 10 includes a frame 12 that supports a body 14 and an internal combustion engine 16. The internal combustion engine 16 includes an exhaust system 18 and an exhaust gas after-treatment system 20 for the reduction of regulated exhaust gas constituents of the internal combustion (IC) engine 16. In the illustrated example, the engine 16 is a diesel engine running on diesel fuel, but in the alternative, the engine 16 could be another type of engine, such as a gasoline engine.

Figure 2:
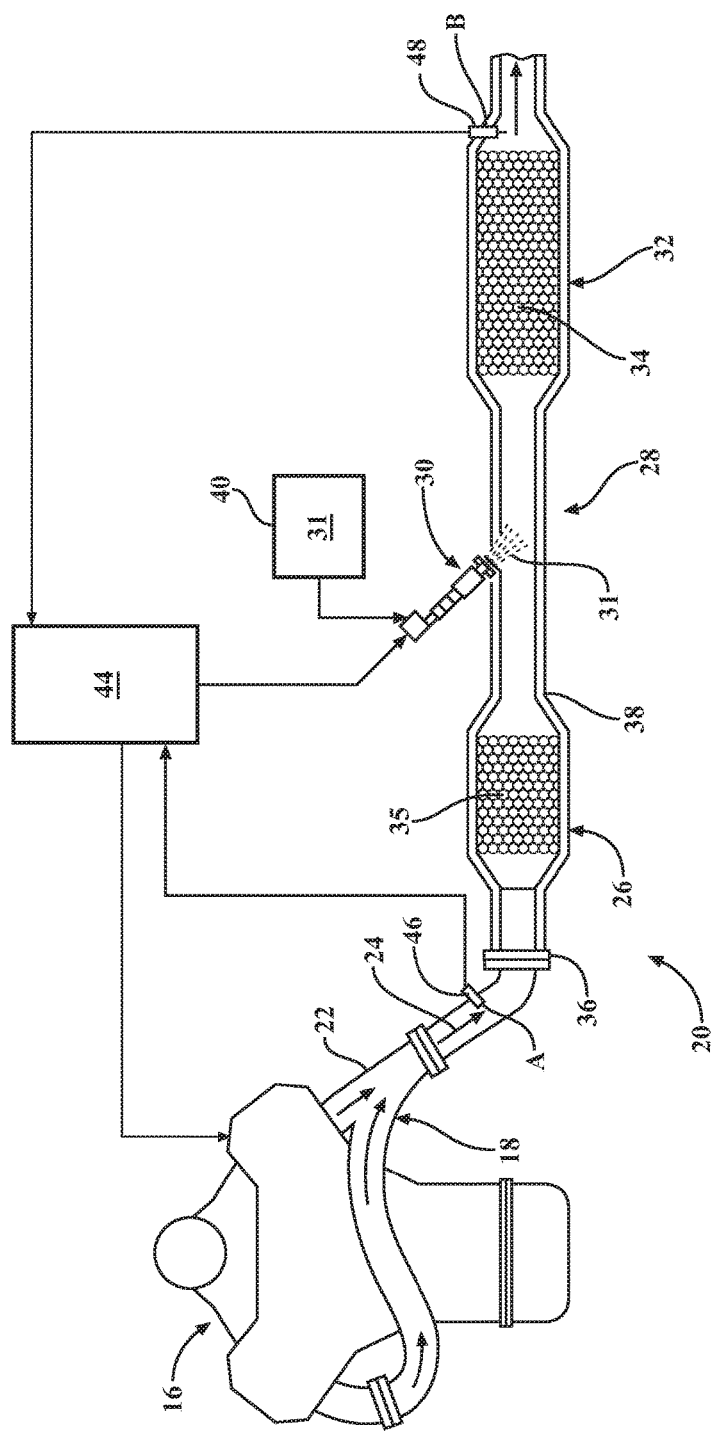
FIG. 2 is a schematic plan view of a tailpipe assembly of the vehicle of FIG. 1, including the SCR system, according to the principles of the present disclosure.

Referring now to FIG. 2 and with continued reference to FIG. 1, the exhaust gas after-treatment system 20 generally includes one or more exhaust gas conduits defined by a tailpipe 22, that channels exhaust gases 24 to one or more exhaust treatment devices. The exhaust gas treatment devices may include, but are not limited to, an oxidation catalyst (OC) device 26 and a selective catalytic reduction (SCR) system 28. By way of example, the SCR system 28 may include one or more reductant injectors 30 configured to inject a reductant 31, such as a diesel exhaust fluid (DEF) containing urea or ammonia, into the conduit defined by the tailpipe 22. A housing 32 having a filter portion 34, which may take the form of a particulate filter (PF), such as a diesel particulate filter, may also be included as shown. As can be appreciated, the exhaust gas after-treatment system 20 may include various combinations of the exhaust treatment elements shown and/or other exhaust treatment devices that are not shown. Thus, exemplary embodiments should not be considered to be limited to the present example.

The OC 26 can be one of various flow-through, oxidation catalyst devices known in the art, or OC 26 could be a wall-flow (particular filter), by way of example. The OC 26 may include a flow-through metal or ceramic monolith substrate 35. The substrate 35 may be packaged in a stainless steel shell or canister (also not separately labeled) having an inlet 36 and an outlet 38 in fluid communication with the exhaust gas conduit or tailpipe 22. The substrate 35 may include an oxidation catalyst compound disposed thereon. The oxidation catalyst compound may be applied as a washcoat and may contain platinum group metals such as platinum (Pt), palladium (Pd), rhodium (Rh), or other suitable oxidizing catalysts, or a combination thereof. The OC 26 is useful in treating unburned gaseous and non-volatile HC and CO, which are oxidized to form carbon dioxide and water.

The SCR system 28 may be disposed downstream of the OC 26, with housing 32 and filter portion 34 being disposed downstream of the injector(s) 30. The filter portion 34 may include a catalyst-containing washcoat disposed thereon. The catalyst-containing washcoat may reduce $NO_x$ in the exhaust stream by utilizing the reductant 31 from the injector(s) 30 to convert the $NO_x$ into $N_2$ and $H_2O$, as understood by those ordinarily skilled in the art. The reductant 31 injected by the injector(s) 30 may include, but is not limited to, ammonia ($NH_3$) and/or urea ($CO(NH_2)_2$). The catalyst-containing washcoat may contain, but is not limited to, a zeolite and one or more base metal components such as iron (Fe), cobalt (Co), copper (Cu), silver (Ag) or vanadium (V), which can operate efficiently to convert $NO_x$ constituents in the exhaust gas 24 into acceptable byproducts (e.g., diatomic nitrogen ($N_2$) and water ($H_2O$)) in the presence of $NH_3$. The reductant 31 utilized by the SCR system 28 may be in the form of a solid, a gas, a liquid, or an aqueous urea solution and may be mixed with air to aid in dispersion of the injected spray.

The filter portion 34 of the housing 32 may also be configured to filter the exhaust gases 24 of carbon and other particulate matter. The filter portion 34 may be constructed using, for example, a ceramic or metallic (e.g., silica carbonite) wall flow monolith exhaust gas filter substrate that is packaged in a rigid, heat resistant shell or canister, having an inlet and an outlet in fluid communication with exhaust gas conduit 22. The ceramic wall flow monolith filter substrate is merely exemplary in nature, and the filter portion 34 may include other filter devices such as wound or packed fiber filters, open cell foams, sintered metal fibers, etc. The filter substrate may include a ceramic filter element (e.g., a wall-flow element) configured to trap particulate matter included in the exhaust gas 24. The exhaust gas aftertreatment system 20 may perform a regeneration process that regenerates the filter portion 34 by burning off the particulate matter trapped in the filter substrate, if desired.

The SCR system 28 introduces the reductant 31 to the exhaust gas 24. A reductant supply source 40 holding an amount of reductant 31 is supplied to the injector(s) 30, as controlled by a reductant injection control module 44. The reductant supply source 40 is in fluid communication with the injector(s) 30. As stated above, the reductant 31 may include, but is not limited to, ammonia ($NH_3$) and urea. Accordingly, the injector(s) 30 may inject a selectable amount of reductant 31 into the exhaust gas conduit 22 such that the reductant 31 is introduced to the exhaust gas 24 at a location upstream of the housing 32.

An upstream $NO_x$ sensor 46 is configured to measure nitrogen oxide compounds ($NO_x$) in the exhaust flow stream 24 within the exhaust conduit defined by the tailpipe 22 at a location A that is upstream from the SCR system 28. The location A is one example of the possible upstream locations for the upstream $NO_x$ sensor 46, but the upstream $NO_x$ sensor 46 could alternatively be located at any other location upstream of the injector(s) 30, such as downstream of the OC 26. The upstream $NO_x$ sensor 46 is disposed in fluid communication with the exhaust conduit defined by the tailpipe 22.

A downstream $NO_x$ sensor 48 is configured to measure nitrogen oxide compounds ($NO_x$) in the exhaust flow stream 24 within the exhaust conduit defined by the tailpipe 22 at a location B that is downstream from the SCR 28. The downstream $NO_x$ sensor 48 may also have sensitivities to $NH_3$, resulting in similar responses by the sensor electrode to $NH_3$ as to $NO_x$. The location B, which is located downstream of the injector(s) 30 and the housing 32 having the filter 34, is one example of the possible downstream locations for the downstream $NO_x$ sensor 48, but the downstream $NO_x$ sensor 48 could alternatively be located at another location downstream of the injector(s) 30, if desired. For example, the $NO_x$ sensor 48 could be located downstream of the injector(s) 30, but upstream of the housing 32 and filter 34. The downstream $NO_x$ sensor 48 is disposed in fluid communication with the exhaust conduit defined by the tailpipe 22.

Each of the $NO_x$ sensors 46, 48 is configured to measure the amount of $NO_x$, typically in PPM, in the flow stream 24 at the locations A, B, respectively. The $NO_x$ sensors 46, 48 send signals to the control module 44 for further processing.

Figure 3:
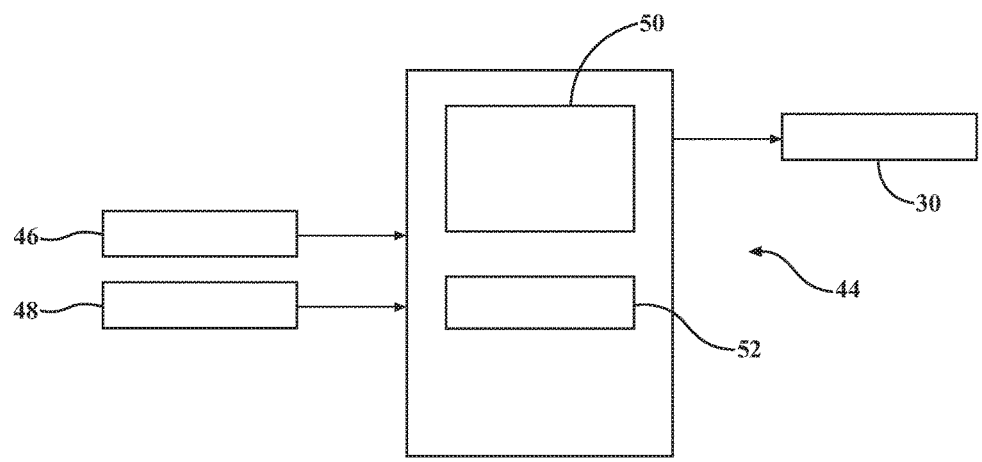
FIG. 3 is a block diagram illustrating a controller configured to adjust reductant injection by the SCR system of FIGS. 1-2, in accordance with the principles of the present disclosure.

With reference to FIG. 3, and continued reference to FIG. 2, the reductant injection control module 44 includes a processor 50 functionally connected to a non-volatile memory 52 containing program instructions. The reductant injection control module 44 may determine and adjust an amount of reductant 31, such as urea, to be injected into exhaust gases 24 based on feedback from the upstream and downstream $NO_x$ sensors 46, 48. More particularly, when the downstream $NO_x$ sensor 48 senses $NO_x$ at location B, the control system 44 typically determines that more of the reductant 31 should be injected to convert the $NO_x$ in the flow stream 24 to nitrogen and water.

Typically, the downstream $NO_x$ sensor 48 would read a lower level of $NO_x$ than the upstream $NO_x$ sensor 46, because the $NO_x$ that existed upstream at location A would have been reduced by the SCR system 28. Most preferably, the $NO_x$ at the downstream $NO_x$ sensor 48 (at location B) is at or near zero.

Figure 4:
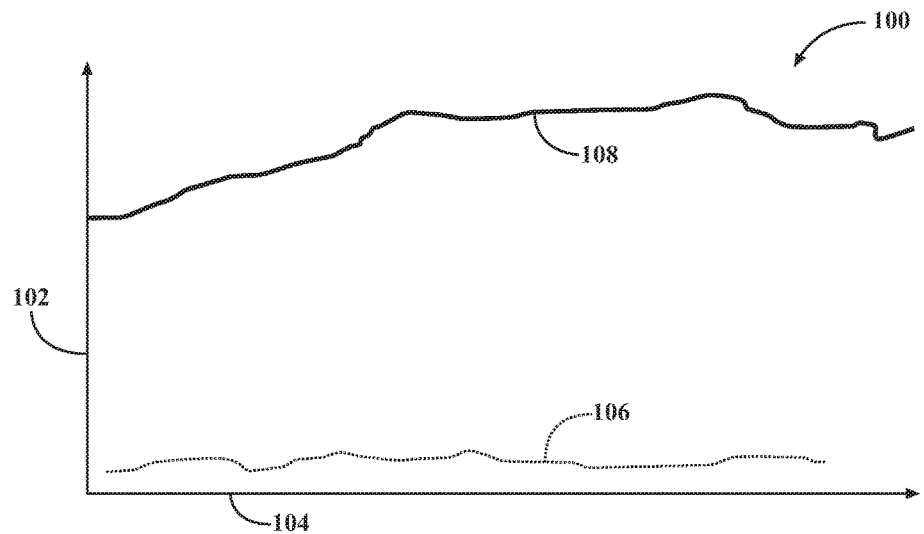
FIG. 4 is a graph illustrating a condition wherein a $NO_x$ sensor located downstream of the SCR system of FIGS. 1-2 reads a higher amount of $NO_x$ than a $NO_x$ sensor located upstream of the SCR system.

Referring now to FIG. 4, a graph 100 illustrates a condition wherein the downstream $NO_x$ sensor 48 reads a higher level of $NO_x$ than the upstream $NO_x$ sensor 46. The $NO_x$ sensor reading level is illustrated on the vertical axis at 102, while time is illustrated on the horizontal axis at 104. The $NO_x$ signal sent by the upstream $NO_x$ sensor 46 is illustrated at trace 106, and the $NO_x$ signal sent by the downstream $NO_x$ sensor 48 is illustrated at trace 108. In this case, the $NO_x$ signal is higher at the downstream $NO_x$ sensor 48 than at the upstream $NO_x$ sensor 46.

Figure 5:
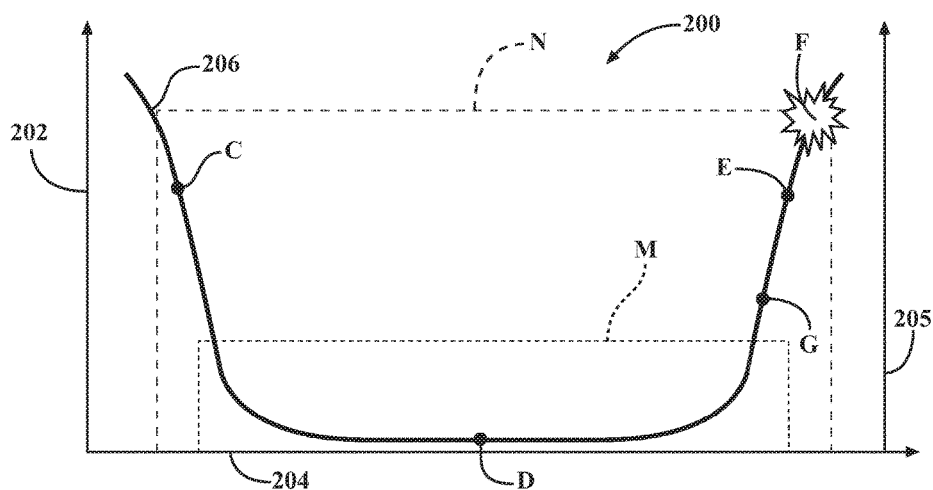
FIG. 5 is a graph illustrating an example reductant injection profile of the SCR system of FIGS. 1-2 as a function of the downstream $NO_x$ sensor reading and an amount of perceived ammonia in the SCR system, according to the principles of the present disclosure.

FIG. 5 helps explain why the $NO_x$ signal might be higher at the downstream $NO_x$ sensor 48 than at the upstream $NO_x$ sensor 46. FIG. 5 is a graph 200 illustrating the downstream NOx sensor 48 reading on the left vertical axis at 202, with the amount of ammonia illustrated along the horizontal axis at 204. The trace 206 represents the amount of reductant 31 being injected by the injector 30, which is controlled by the controller 44, and correlates to a right vertical axis 205 corresponding to an amount of reductant injected. At the left side of the graph 200 at location C, with high levels of $NO_x$ at the location B of the downstream $NO_x$ sensor 48 and with low levels of ammonia, a high amount of injection incurs, as shown by trace 206, as would be expected. As more reductant is injected, the downstream $NO_x$ levels diminish, such as at point D. A calibrated system model is programmed into the controller 44 to keep the $NO_x$ levels low at the downstream location B, and the sensor model operates within the range represented by the model box M.

If ammonia levels become too high, and ammonia slip is occurring, the ammonia can actually react and turn into $NO_x$. In addition or in the alternative, the downstream $NO_x$ sensor 48 can read all or some of the excess ammonia as $NO_x$ and the excess $NH_3$ may slip out of the tailpipe 22 unless it reacts with a downstream component. Thus, at the right side of the graph 200, such at location E, a high amount of ammonia exists in the system and the downstream $NO_x$ sensor signal is high. Accordingly, the controller 44 interprets that there is enough ammonia to reduce all of the $NO_x$. The maximum capacity of the SCR housing 20 is represented by box N. At point F, the downstream $NO_x$ sensor 48 signal is so high that the amount of ammonia is interpreted by the controller 44 to be as much as the physical constraints of the SCR system 28 can hold. Accordingly, the injection of reductant 31 through the injector 30 is completely stopped until the ammonia can be "used up."

However, the problem is that the downstream $NO_x$ sensor 48 is still high at point F, and therefore, the control system 44 is unable to determine whether $NO_x$ or ammonia is high (or both are). This illustration of high ammonia slip at point F may occur, for example, if one of the sensors 46, 48 is faulty or "stuck," or if the upstream $NO_x$ offset has been set too low.

Figure 6:
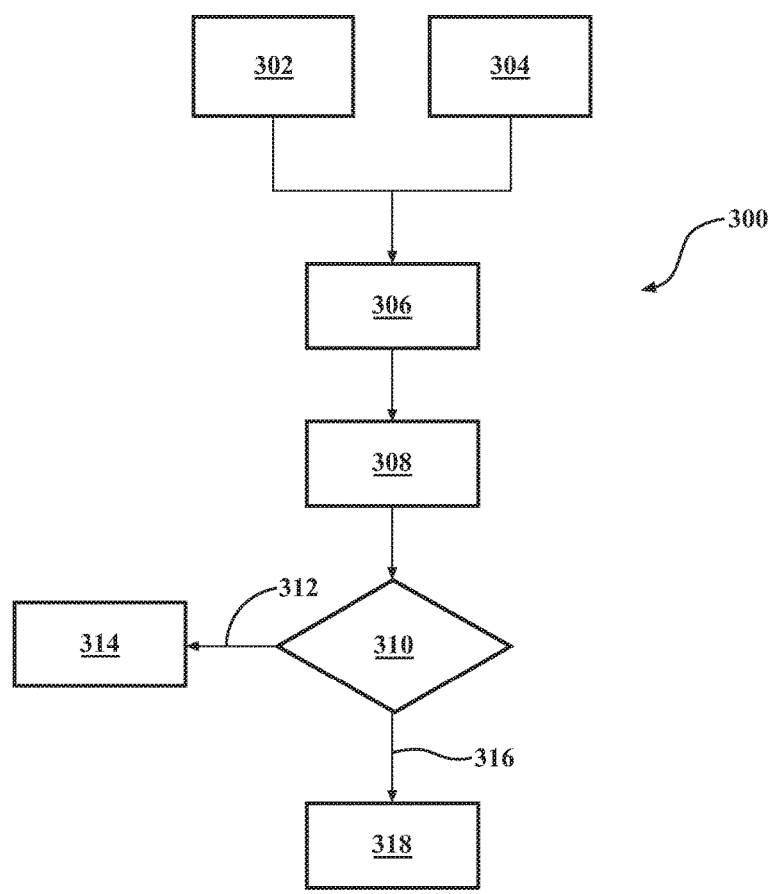
FIG. 6 is a block diagram illustrating a method of controlling an SCR reductant delivery system, in accordance with the principles of the present disclosure.

Referring now to FIG. 6, a method 300 is illustrated for controlling an SCR reductant delivery system, such as the control module 44 and the SCR system 28. The method 300 may be implemented as an instruction by the processor 50 and memory 52 of the controller or control module 44. The method 300 includes a step 302 of determining an amount of nitrogen oxide compounds ($NO_x$) present in a tailpipe at a first location (such as location A) upstream of a reductant injector to define a determined upstream $NO_x$ amount and a step 304 of determining an amount of $NO_x$ present in the tailpipe at a second location (such as location B) downstream of the reductant injector to define a determined downstream $NO_x$ amount. The steps 302 and 304 may be performed simultaneously, or one after the other, by way of example. In some implementations, the amounts of $NO_x$ are based one signals sent from the upstream and downstream $NO_x$ sensors 46, 48 that may be continuous or periodic, and the control system 44 may be configured to monitor the sensor signals and to repeat the steps of the method 300.

The $NO_x$ signals from each of the sensors 46, 48 may be further processed so that the determined downstream $NO_x$ amount and the determined upstream $NO_x$ amount may be determined as masses of $NO_x$. The masses of $NO_x$ may be determined based on $NO_x$ amounts determined in parts-per-million ppm by the sensors 46, 48 and by taking into account the flow rate of the exhaust stream at the points A, B of each of the sensors 46, 48, respectively.

The method 300 then includes a step 306 of subtracting the determined upstream $NO_x$ amount from the determined downstream $NO_x$ amount to define a subtracted $NO_x$ value. The subtracted $NO_x$ value will only be positive if the downstream $NO_x$ amount is greater than the upstream $NO_x$ amount.

The method 300 has a step 308 of determining a cumulative difference based on the subtracted $NO_x$ value. If the subtracted $NO_x$ value is the first subtracted $NO_x$ value obtained, then the cumulative difference will be the subtracted $NO_x$ value, or in some examples, the cumulative difference may be defined to be the subtracted $NO_x$ value. In other examples, however, the cumulative difference may represent a summation or integral of subtracted $NO_x$ values that are determined by the control module 44. Thus, if the system is being well controlled (e.g., in the M region in graph 200 of FIG. 5), some subtracted $NO_x$ values will be positive and some will be negative, cancelling each other out, and the cumulative difference will remain at or near zero. However, if the ammonia slip is creeping up as shown on the right side of the graph 200 in FIG. 5, the cumulative difference will rise each time that a subtracted $NO_x$ value is determined.

The method 300 proceeds from step 308 to a step 310 of determining whether the cumulative difference exceeds a control threshold. For example, the control module 44 could be programmed with a predetermined control threshold beyond which it would be desirable to take action to correct the ammonia slip. The control threshold could be, for example, at point E on the graph 200 in FIG. 5, or even sooner along the ammonia slip continuum, such as at point G. If, in step 310, it is determined that the cumulative difference does not exceed the control threshold, the method 300 proceeds along path 312 to step 314. In step 314, a selected upstream $NO_x$ value is set as the determined upstream $NO_x$ amount. Thus, the upstream $NO_x$ amount that is determined from the signal of the upstream $NO_x$ sensor 46 is used by the controller 44 to control the injection of the reductant 31. The system is well controlled when the subtracted $NO_x$ value or the cumulative difference does not exceed the control threshold, as explained above.

If, however, the cumulative difference does exceed the control threshold, the method 300 proceeds from step 310 along path 316 to step 318. Thus, the downstream $NO_x$ sensor 48 signal is sending a high enough signal over the signal of the upstream $NO_x$ sensor 46 that the cumulative difference goes beyond the preset control threshold. In such a case, it is desirable to correct the system to bring the $NO_x$ or ammonia slip under control. In this case, it is believed that the upstream $NO_x$ sensor 46 signal may be erroneous, and therefore, reductant 31 injection may soon be halted or already be halted (depending on where the control threshold is set). Therefore, in the step 318, the method 300 includes setting the selected upstream $NO_x$ value as a predetermined model upstream $NO_x$ amount. More particularly, a predetermined model of an expected signal from the upstream $NO_x$ sensor 46 may be programmed into the controller 44, and the controller 44 may revert to using this model of the upstream $NO_x$ amount in order to bring the upstream and downstream $NO_x$ sensor signals closer together and the system back under control.

Figure 7:
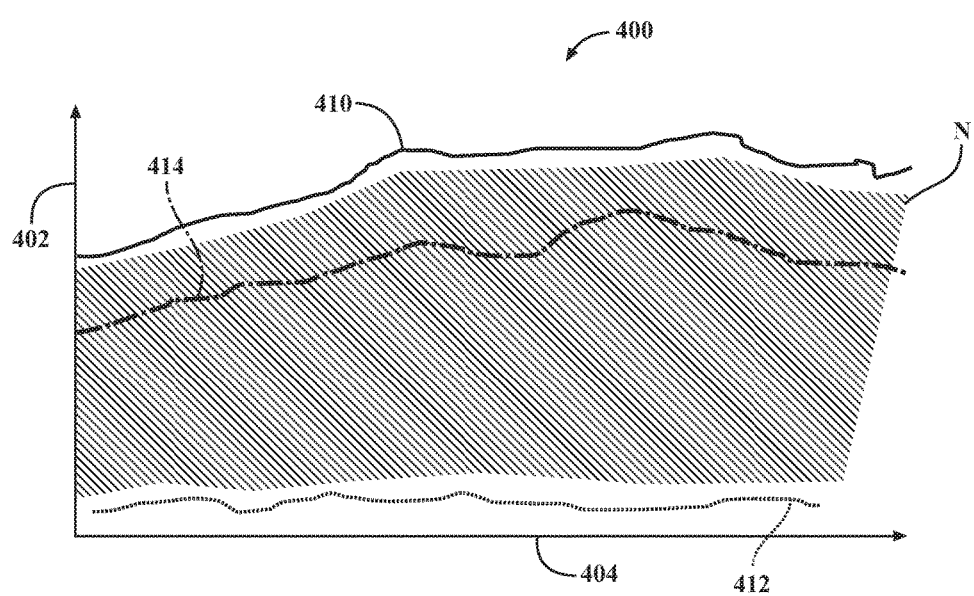
FIG. 7 is a graph illustrating an upstream $NO_x$ sensor signal, a downstream $NO_x$ sensor signal, and a predetermined model of an upstream $NO_x$ sensor signal, all as functions of time, in accordance with the principles of the present disclosure.

For example, referring to FIG. 7, a graph 400 illustrates $NO_x$ levels on a vertical axis at 402, with time on a horizontal axis at 404. A $NO_x$ signal from the downstream $NO_x$ sensor 48 is illustrated at trace 410, and a $NO_x$ signal from the upstream $NO_x$ sensor 46 is illustrated at trace 412. The physical constraints of the SCR reductant delivery system 28 are represented by area N. With the upstream and downstream $NO_x$ signals 412, 410 being outside of the physical constraints N of the SCR system 28, the controller 44 may be in a stuck mode wherein reductant 31 that should be delivered is not delivered via the injector 30 to reduce $NO_x$ because the control module 44 sees that system as already being saturated with ammonia. Accordingly, as in step 318 of FIG. 6, the upstream $NO_x$ signal 412 is replaced by a predetermined model $NO_x$ signal 414. The signal 414 is a calibrated upstream $NO_x$ signal for a model of a well-controlled system.

The controller 44 then uses the model signal 414 instead of the true upstream $NO_x$ sensor signal 412 for purposes of controlling the injection of reductant 31, and the method 300 may then restart. The cumulative difference will continue to be determined at step 308, and in some circumstances, the control system 44 may be able to regain control over the ammonia slip and bring the $NO_x$ levels back into the desired sensor model region M shown in FIG. 5.

Figure 8:
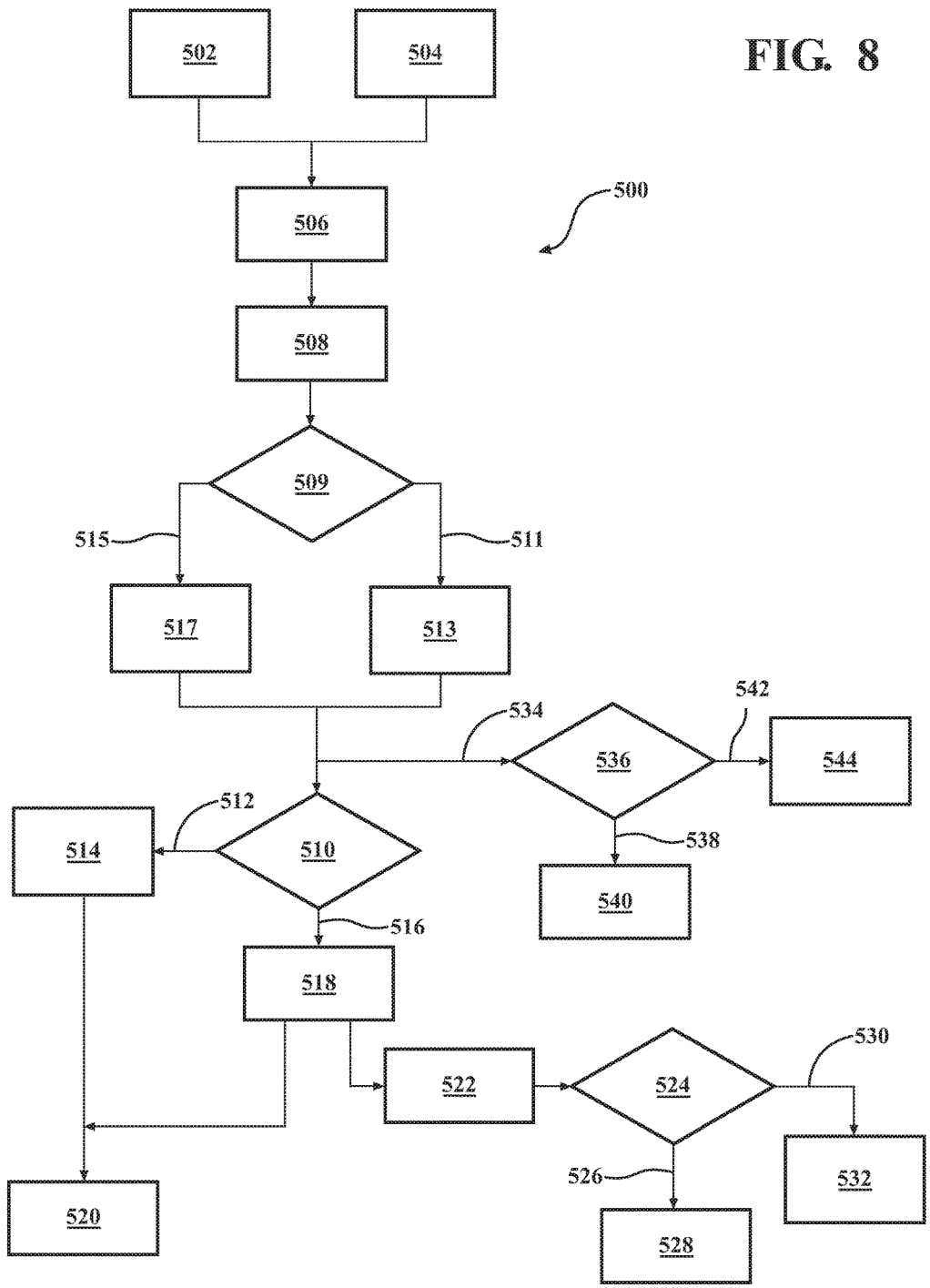
FIG. 8 is a block diagram illustrating another method of controlling an SCR reductant delivery system, according to the principles of the present disclosure.

Referring now to FIG. 8, another variation of a method for controlling an SCR reductant delivery system, such as system 28, is illustrated and generally designated at 500. The method 500 includes additional details over the method 300 described above, and any of the details described herein with respect to the method 500 may be equally applied to the method 300, if desired. Like the method 300, the method 500 may be implemented as an instruction set by the processor 50 and memory 52 of the controller or control system 44.

The method 500 includes a step 502 of determining an amount of nitrogen oxide compounds ($NO_x$) present in a tailpipe at a first location upstream of a reductant injector to define a determined upstream $NO_x$ amount and a step 504 of determining an amount of $NO_x$ present in the tailpipe at a second location downstream of the reductant injector to define a determined downstream $NO_x$ amount. The steps 502 and 504 may be performed simultaneously, or one after the other, by way of example. In some implementations, the amounts of $NO_x$ are based on signals sent from the upstream and downstream $NO_x$ sensors 46, 48 that may be continuous or periodic, and the control system 44 may be configured to monitor the sensor signals.

The $NO_x$ signals from each of the sensors 46, 48 may be further processed so that the determined downstream $NO_x$ amount and the determined upstream $NO_x$ amount may be determined as masses of $NO_x$. The masses of $NO_x$ may be determined based on $NO_x$ amounts determined in parts-per-million ppm by the sensors 46, 48 and by taking into account the flow rate of the exhaust stream at the points A, B of each of the sensors 46, 48, respectively.

The method 500 then includes a step 506 of subtracting the determined upstream $NO_x$ amount from the determined downstream $NO_x$ amount to define a subtracted $NO_x$ value. The subtracted $NO_x$ value will only be positive if the downstream $NO_x$ amount is greater than the upstream $NO_x$ amount.

The method 500 has a step 508 of determining a cumulative difference based on the subtracted $NO_x$ value. If the subtracted $NO_x$ value is the first subtracted $NO_x$ value obtained, then the cumulative difference will be the subtracted $NO_x$ value, or in some examples, the cumulative difference may be defined to be the subtracted $NO_x$ value. In other examples, however, the cumulative difference may represent a summation or integral of subtracted $NO_x$ values that are determined by the controller 44. Thus, the cumulative difference may be determined by integrating the subtracted $NO_x$ value with previous subtracted $NO_x$ values obtained earlier in a key cycle.

If the system is being well controlled, some subtracted $NO_x$ values will be positive and some will be negative, cancelling each other out, and the cumulative difference (the integral of the subtracted $NO_x$ values) will remain at or near zero. However, if the ammonia slip is creeping up at shown on the right side of the graph 200 in FIG. 5, the cumulative difference will rise each time that a subtracted $NO_x$ value is determined.

The method 500 then may proceed to an optional step 509 of determining whether the cumulative difference is above zero, e.g., not a negative number. If the cumulative difference is above zero, which indicates that the downstream $NO_x$ amount is greater than the upstream $NO_x$ amount, the method 500 proceeds along route 511 to step 513. In step 513, the cumulative difference is used as previously calculated or determined, and the cumulative difference value is used in the next step 510.

If, however, in step 509 it is determined that the cumulative difference is negative or below zero, which indicates that the downstream $NO_x$ amount is less than the upstream $NO_x$ amount, the method 500 proceeds along route 515 to step 517. In step 517, the cumulative difference is assigned a value of zero, and zero is used for the cumulative difference value in the next step 510.

Step 510 may be similar to the step 310 described above with respect to FIG. 6. In step 510, the method 500 includes determining whether the cumulative difference value (as determined in either step 513 or 517) exceeds a control threshold. For example, the controller 44 could have some predetermined control threshold beyond which it would be desirable to take action to correct the ammonia slip. The control threshold could be, for example, at point E on the graph 200 in FIG. 5, or even sooner along the ammonia slip continuum, such as at point G.

If, in step 510, it is determined that the cumulative difference does not exceed the control threshold, the method 500 proceeds along path 512 to step 514. In step 514, a selected upstream $NO_x$ value is set as the determined upstream $NO_x$ amount. Thus, the upstream $NO_x$ amount that is determined based on the signal of the upstream $NO_x$ sensor 46 is used by the controller 44 to control the injection of the reductant 31. The system is well controlled when the subtracted $NO_x$ value or the cumulative difference does not exceed the control threshold, as explained above.

If, however, the cumulative difference does exceed the control threshold, the method 500 proceeds from step 510 along path 516 to step 518. Thus, the downstream $NO_x$ sensor 48 signal is showing a high enough value over the upstream $NO_x$ sensor 46 (with flow rate taken into consideration) that the cumulative difference goes beyond the preset control threshold. In such a case, it is desirable to correct the system to bring the $NO_x$ or ammonia slip under control. The upstream $NO_x$ sensor 46 signal may be erroneous, and therefore, reductant 31 injection may soon be halted or already be halted (depending on where the control threshold is set).

Therefore, in the step 518, the method 500 includes setting the selected upstream $NO_x$ value as a predetermined model upstream $NO_x$ amount. More particularly, a predetermined model of an expected signal from the upstream $NO_x$ sensor 46 may be programmed into the controller 44, and the controller 44 may revert to using this model of the upstream $NO_x$ amount in order to bring the upstream and downstream $NO_x$ sensor signals closer together and the system back under control. Thus, the model upstream signal 414 shown in FIG. 7 may be used, as explained above. The upstream $NO_x$ signal 412 is replaced by a predetermined model $NO_x$ signal 414. The signal 414 is a calibrated upstream $NO_x$ signal for a model of a well-controlled system.

The method 500 proceeds from either of the steps 514, 518 that was selected by the step 510 to a step 520. In step 520, the method 500 includes injecting reductant 31, or determining whether to inject reductant 31, based on the downstream $NO_x$ amount and on the selected upstream $NO_x$ value, which could be the upstream $NO_x$ amount as applied in step 514 or the predetermined model upstream $NO_x$ amount as applied in step 518.

As explained above, if the method 500 or controller 44 uses the model signal 414 instead of the true upstream $NO_x$ sensor signal 412 for purposes of controlling the injection of reductant 31, the system may be brought back under control into the model region M, as desired. The method 500 may then restart and the cumulative difference will continue to be determined at step 508, and in some circumstances, the control system 44 may be able to regain control over the ammonia slip and bring the $NO_x$ levels back into the desired sensor model region M shown in FIG. 5.

In addition to determining whether to reset the control to the model control signal as determined by 510, after determining the cumulative difference in step 508, the method 500 may include further diagnostic steps, in some variations of the method 500. For example, each time that the method 500 determines in step 510 to follow path 516 to select the predetermined model as the upstream $NO_x$ value in step 518, the method 500 may also include a step 522 of incrementing a counting device. Thus, in step 522, the method 500 or controller 44 increments a counting device to define a count each time the selected upstream $NO_x$ value is set as the predetermined model upstream $NO_x$ amount.

The method 500 may then apply the count in a step 524 to determine whether the count exceeds a predetermined count threshold. If the count does not exceed the predetermined count threshold (e.g., the system has not been reset at least the number of times in the count threshold), the method 500 proceeds along path 526 to step 528, where the method 500 determines that the count threshold is not met.

If, however, in step 524 it is determined that the count does exceed the predetermined count threshold, the method 500 proceeds along a path 530 to step 532. In step 532, where the count has exceeded the predetermined count threshold, the method 500 or control system 44 diagnoses a sensor error. Thus, the control system 44 or method 500 concludes that perhaps one of the $NO_x$ sensors 46, 48 may have an error since the system is continuously having to reset the upstream $NO_x$ amount to the predetermined model.

Furthermore, in addition to determining whether to reset the control to the model control signal as determined by 510, after determining the cumulative difference in step 508, the method 500 may include another diagnostic logic route 534. The method 500 may proceed from step 513 or 517 (or step 508), along path 534 to diagnostic step 536.

In step 536, the method 500 includes determining whether the cumulative difference value (as determined in either step 513 or 517) exceeds a diagnostic threshold (which may have a different value than the control threshold used in step 510). For example, the controller 44 could have some predetermined diagnostic threshold beyond which it would be desirable to activate a diagnostic alert. The diagnostic threshold could be, for example, at point F on the graph 200 in FIG. 5, or sooner along the ammonia slip continuum, such as at point E, if desired.

If, in step 536, it is determined that the cumulative difference does not exceed the diagnostic threshold, the method 500 proceeds along path 538 to step 540. In step 540, the method 500 determines not to activate any diagnostic signal because the diagnostic threshold is not met. The method 500 may then restart as desired to continue to monitor the $NO_x$ sensor signals and to update the cumulative difference.

If, however, the cumulative difference does exceed the diagnostic threshold, the method 500 proceeds from step 536 along path 542 to step 544. Thus, the downstream $NO_x$ sensor 48 signal is showing a high enough value over the upstream $NO_x$ sensor 46 (with flow rate taken into consideration) that the cumulative difference goes beyond the preset diagnostic threshold. In such a case, it is desirable to set a diagnostic alert or otherwise activate a diagnostic signal. The upstream $NO_x$ sensor 46 signal may be erroneous, and therefore, reductant 31 injection may soon be halted or already be halted (depending on where the diagnostic threshold is set).

Therefore, in the step 544, the method 500 includes activating a diagnostic signal. The diagnostic signal could include, for example, turning on a check-engine light.

Referring to FIG. 5, both the control threshold and the diagnostic threshold may be determined based on a maximum ammonia storage capacity threshold M of the of the selective catalytic reduction system 28. A maximum storage capacity multiplier may be determined based on the maximum ammonia storage capacity N of the SCR system 28, and that multiplier may be used to determine the control threshold and the diagnostic threshold. In one example, the maximum storage capacity multiplier may be multiplied by a control constant to determine the control threshold, and the maximum storage capacity multiplier may be multiplied by a diagnostic constant to determine the diagnostic threshold. In the alternative, the control threshold and the diagnostic threshold may be determined separate of the maximum storage capacity, in any other desirable manner. The diagnostic constant may be greater than the control constant, so that the system may try to correct itself using the upstream $NO_x$ reset prior to activating the diagnostic alert, which would then occur when the reset does not achieve bringing the system under control.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit (s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The control module 44 of FIG. 2 may be programmed to execute the steps of the methods 300, 500 as defined with reference to FIGS. 3 and 5.

The terminology used herein is for the purpose of describing particular examples only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular examples disclosed, but will include all examples falling within the scope the appended claims.

What is claimed is:

1. A method of controlling a selective catalytic reduction reductant delivery system, the method comprising:
    determining an amount of nitrogen oxide compounds ($NO_x$) present in a tailpipe at a first location upstream of a reductant injector to define a determined upstream $NO_x$ amount;
    determining an amount of $NO_x$ present in the tailpipe at a second location downstream of the reductant injector to define a determined downstream $NO_x$ amount;
    subtracting the determined upstream $NO_x$ amount from the determined downstream $NO_x$ amount to define a subtracted $NO_x$ value;
    determining a cumulative difference based on the subtracted $NO_x$ value;
    determining whether the cumulative difference exceeds a control threshold;
    setting a selected upstream $NO_x$ value as a predetermined model upstream $NO_x$ amount if the cumulative difference exceeds the control threshold; and
    setting the selected upstream $NO_x$ value as the determined upstream $NO_x$ amount if the cumulative difference does not exceed the control threshold.

2. The method of claim 1, further comprising determining whether to inject a reductant based on the selected upstream $NO_x$ value and the determined downstream $NO_x$ amount.

3. The method of claim 2, further comprising injecting the reductant according to a predetermined injection model based on the selected upstream $NO_x$ value and the determined downstream $NO_x$ amount.

4. The method of claim 3, further comprising determining the determined upstream $NO_x$ amount as a mass of $NO_x$ based on an upstream exhaust fluid flow rate at the first location, and determining the determined downstream $NO_x$ amount as a mass of $NO_x$ based on a downstream exhaust fluid flow rate at the second location.

5. The method of claim 4, further comprising determining the cumulative difference by integrating the subtracted $NO_x$ value with previous subtracted $NO_x$ values obtained earlier in a key cycle.

6. The method of claim 5, further comprising:
    determining whether the cumulative difference exceeds a diagnostic threshold; and
    activating a diagnostic signal if the cumulative difference exceeds the diagnostic threshold.

7. The method of claim 6, further comprising determining the control threshold and the diagnostic threshold based on a maximum ammonia storage capacity of the selective catalytic reduction reductant delivery system.

8. The method of claim 7, further comprising:
    determining a maximum storage capacity multiplier based on the maximum ammonia storage capacity of selective catalytic reduction reductant delivery system;
    determining the control threshold by multiplying the maximum storage capacity multiplier by a control constant; and
    determining the diagnostic threshold by multiplying the maximum storage capacity multiplier by a diagnostic constant, wherein the diagnostic constant is greater than the control constant, and the diagnostic threshold is greater than the control threshold.

9. The method of claim 8, further comprising:
    incrementing a counting device to define a count each time the selected upstream $NO_x$ value is set as the predetermined model upstream $NO_x$ amount; and
    diagnosing a sensor error if the count exceeds a predetermined count threshold.

10. A selective catalytic reduction reductant injection control module including a processor and a non-volatile memory including a set of instructions which are configured to cause the processor to:
    determine an amount of nitrogen oxide compounds ($NO_x$) present in a tailpipe at a first location upstream of a reductant injector to define a determined upstream $NO_x$ amount;
    determine an amount of $NO_x$ present in the tailpipe at a second location downstream of the reductant injector to define a determined downstream $NO_x$ amount;
    subtract the determined upstream $NO_x$ amount from the determined downstream $NO_x$ amount to define a subtracted $NO_x$ value;
    determine a cumulative difference based on the subtracted $NO_x$ value;
    determine whether the cumulative difference exceeds a control threshold;
    set a selected upstream $NO_x$ value as a predetermined model upstream $NO_x$ amount if the cumulative difference exceeds the control threshold; and
    set the selected upstream $NO_x$ value as the determined upstream $NO_x$ amount if the cumulative difference does not exceed the control threshold.

11. The selective catalytic reduction reductant injection control module of claim 10, further configured to cause injection of the reductant according to a predetermined injection model based on the selected upstream $NO_x$ value and the determined downstream $NO_x$ amount.

12. The selective catalytic reduction reductant injection control module of claim 11, further configured to determine the determined upstream $NO_x$ amount as a mass of $NO_x$ based on an upstream exhaust fluid flow rate at the first location and to determine the determined downstream $NO_x$ amount as a mass of $NO_x$ based on a downstream exhaust fluid flow rate at the second location.

13. The selective catalytic reduction reductant injection control module of claim 12, further configured to determine the cumulative difference by integrating the subtracted $NO_x$ value with previous subtracted $NO_x$ values obtained earlier in a key cycle.

14. The selective catalytic reduction reductant injection control module of claim 13, further configured to:
   determine whether the cumulative difference exceeds a diagnostic threshold; and
   activate a diagnostic signal if the cumulative difference exceeds the diagnostic threshold.

15. The selective catalytic reduction reductant injection control module of claim 14, a maximum storage capacity multiplier being based on a maximum ammonia storage capacity of a selective catalytic reduction unit, the control threshold being based on multiplying the maximum storage capacity multiplier by a control constant, the diagnostic threshold being based on multiplying the maximum storage capacity multiplier by a diagnostic constant, wherein the diagnostic constant is greater than the control constant, and the diagnostic threshold is greater than the control threshold.

16. The selective catalytic reduction reductant injection control module of claim 15, further configured to:
   increment a counting device to define a count each time the selected upstream $NO_x$ value is set as the predetermined model upstream $NO_x$ amount; and
   diagnose a sensor error if the count exceeds a predetermined count threshold.

17. A vehicle system comprising:
   a tailpipe assembly defining an exhaust conduit;
   a selective catalytic reduction system including a reductant injector, the reductant injector configured to inject a reductant into fluid communication with the exhaust conduit of the tailpipe assembly;
   an upstream $NO_x$ sensor configured to measure nitrogen oxide compounds ($NO_x$) in an exhaust flow stream within the exhaust conduit, the upstream $NO_x$ sensor being disposed in fluid communication with the exhaust conduit at a first location upstream of the selective catalytic reduction system;
   a downstream $NO_x$ sensor configured to measure $NO_x$ in the exhaust flow stream within the exhaust conduit, the downstream $NO_x$ sensor being disposed in fluid communication with the exhaust conduit at a second location downstream of the reductant injector; and
   a reductant injection control module including a processor and a non-volatile memory including a set of instructions configured to cause the processor to:
      determine an amount of $NO_x$ present in the exhaust conduit based on an upstream signal from the upstream $NO_x$ sensor to define a determined upstream $NO_x$ amount;
      determine an amount of $NO_x$ present in the exhaust conduit based on a downstream signal from the downstream $NO_x$ sensor to define a determined downstream $NO_x$ amount;
      subtract the determined upstream $NO_x$ amount from the determined downstream $NO_x$ amount to define a subtracted $NO_x$ value;
      determine a cumulative difference based on the subtracted $NO_x$ value;
      determine whether the cumulative difference exceeds a control threshold;
      set a selected upstream $NO_x$ value as a predetermined model upstream $NO_x$ amount if the cumulative difference exceeds the control threshold; and
      set the selected upstream $NO_x$ value as the determined upstream $NO_x$ amount if the cumulative difference does not exceed the control threshold.

18. The vehicle system of claim 17, the reductant injection control module being further configured to cause the reductant injector to inject the reductant according to a predetermined injection model based on the selected upstream $NO_x$ value and the determined downstream $NO_x$ amount.

19. The vehicle system of claim 18, the reductant injection control module being further configured to:
   determine the determined upstream $NO_x$ amount as a mass of $NO_x$ based on an upstream exhaust fluid flow rate in the exhaust conduit at the first location;
   determine the determined downstream $NO_x$ amount as a mass of $NO_x$ based on a downstream exhaust fluid flow rate in the exhaust conduit at the second location; and
   determine the cumulative difference by integrating the subtracted $NO_x$ value with previous subtracted $NO_x$ values obtained earlier in a key cycle.

20. The vehicle system of claim 19, the selective catalytic reduction system having a maximum ammonia storage capacity, the reductant injection control module being further configured to:
   determine whether the cumulative difference exceeds a diagnostic threshold; and
   activate a diagnostic signal if the cumulative difference exceeds the diagnostic threshold,
   wherein a maximum storage capacity multiplier is based on the maximum ammonia storage capacity of the selective catalytic reduction system, the control threshold being based on multiplying the maximum storage capacity multiplier by a control constant, and the diagnostic threshold being based on multiplying the maximum storage capacity multiplier by a diagnostic constant, wherein the diagnostic constant is greater than the control constant, and the diagnostic threshold is greater than the control threshold.

* * * * *